United States Patent
Rastgar

(10) Patent No.: US 10,242,447 B2
(45) Date of Patent: Mar. 26, 2019

(54) VIDEO PROCESSING SYSTEM AND METHOD FOR DEFORMATION AND OCCLUSION RESISTANT OBJECT TRACKING IN VIDEO CONTENT

(71) Applicant: SONY CORPORATION, Tokyo (JP)

(72) Inventor: Houman Rastgar, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 92 days.

(21) Appl. No.: 15/259,563

(22) Filed: Sep. 8, 2016

(65) Prior Publication Data
US 2018/0068448 A1 Mar. 8, 2018

(51) Int. Cl.
*G06T 7/246* (2017.01)
*G06K 9/62* (2006.01)
*G06K 9/46* (2006.01)
*G06T 7/00* (2017.01)

(52) U.S. Cl.
CPC .......... *G06T 7/0042* (2013.01); *G06K 9/4604* (2013.01); *G06K 9/6202* (2013.01); *G06K 9/6215* (2013.01); *G06T 7/248* (2017.01); *G06T 2207/10024* (2013.01)

(58) Field of Classification Search
None
See application file for complete search history.

(56) References Cited

U.S. PATENT DOCUMENTS

| 6,100,925 A * | 8/2000 | Rosser | G01S 3/7864 348/169 |
|---|---|---|---|
| 6,185,314 B1 * | 2/2001 | Crabtree | G01S 3/7865 348/169 |
| 6,683,968 B1 | 1/2004 | Pavlovic et al. | |
| 2005/0185826 A1 * | 8/2005 | Georgescu | G06K 9/3216 382/103 |
| 2010/0322534 A1 * | 12/2010 | Bolme | G06K 9/746 382/278 |
| 2014/0201126 A1 * | 7/2014 | Zadeh | G06K 9/627 706/52 |

OTHER PUBLICATIONS

Lee et al., "Object Tracking and Target Reacquisition Based on 3-D Range Data for Moving Vehicles," IEEE Transactions on Image Processing, vol. 20, No. 10, Oct. 2011.*
Zheng et al., "Multi-object Template Matching Using Radial Ring Code Histograms," International Conference on Image and Graphics ICIG 2015: Image and Graphics pp. 555-564, Aug. 4, 2015.*

(Continued)

*Primary Examiner* — Soo Shin
(74) *Attorney, Agent, or Firm* — Chip Law Group

(57) ABSTRACT

Various aspects of a video processing system and method for object tracking in video content are disclosed herein. The system includes one or more circuits in an electronic device that are configured to detect a current state of an object in a current image frame from a sequence of image frames based on a plurality of first parameters. The system is further configured to adjust a plurality of second parameters for computation of a plurality of features of the object in the current image frame, based on the detected current state. The system is further configured to track the object in the current image frame based on a first feature of the computed plurality of features of the object.

21 Claims, 4 Drawing Sheets

(56) References Cited

OTHER PUBLICATIONS

Greice Martins De Freitas et al., "Multiple state-based video tracking for surveillance applications", Department of Computer Engineering and Industrial Automation, In: SIBGRAPI—Brazilian Symposium on Computer Graphics and Image Processing, 2009, Rio de Janeiro. SIBGRAPI—Brazilian Symposium on Computer Graphics and Image Processing, 2009, Dec. 10, 2009, 2 pages.

David Beymer et al., "Real-Time Tracking of Multiple People Using Continuous Detection", Proc. ICCV Frame-rate Workshop, Conference Paper, 1999, pp. 8.

Jiasheng Song et al., "Multi-feature Visual Tracking Using Adaptive Unscented Kalman Filtering", Computational Intelligence and Design (ISCID), 2013 Sixth International Symposium, Oct. 28-29, 2013, pp. 197-200.

* cited by examiner

VIDEO PROCESSING SYSTEM AND METHOD FOR DEFORMATION AND OCCLUSION RESISTANT OBJECT TRACKING IN VIDEO CONTENT

REFERENCE

None.

FIELD

Various embodiments of the disclosure relate to a video processing system. More specifically, various embodiments of the disclosure relate to a video processing system and method for object tracking in video content.

BACKGROUND

Recent advancements in the field of computer vision have led to development of various methods and techniques for visual tracking of objects over a period of time by use of a tracker, such as an imaging device. Typically, the tracker estimates the trajectory of an object in an image plane, as the object moves around in a scene. In other words, the tracker assigns consistent labels to the objects and accordingly, attempts to locate the same object in subsequent frames of a video clip.

Currently, various techniques, such as template tracking techniques, are utilized for object tracking in video content. Generally, the template tracking techniques extract object features from an image patch of an object via "spatially sensitive" features, such as histogram of oriented gradients (HOG). During tracking, the template tracking techniques register the image patch of the object with next instance of the object in the next frame, via one of more difference metrics, such as Sum of Square Difference (SSD) or Normalized Cross Correlation (NCC). However, in an event that the object is associated with occlusions and non-rigid deformations, the template tracking technique may provide inaccurate tracking results as the tracking gets drifted from the original location of the object. Thus, an advanced and robust tracking technique may be required to accurately track such objects that are associated with deformations and occlusions.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A video processing system and method are provided for object tracking in video content substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1:
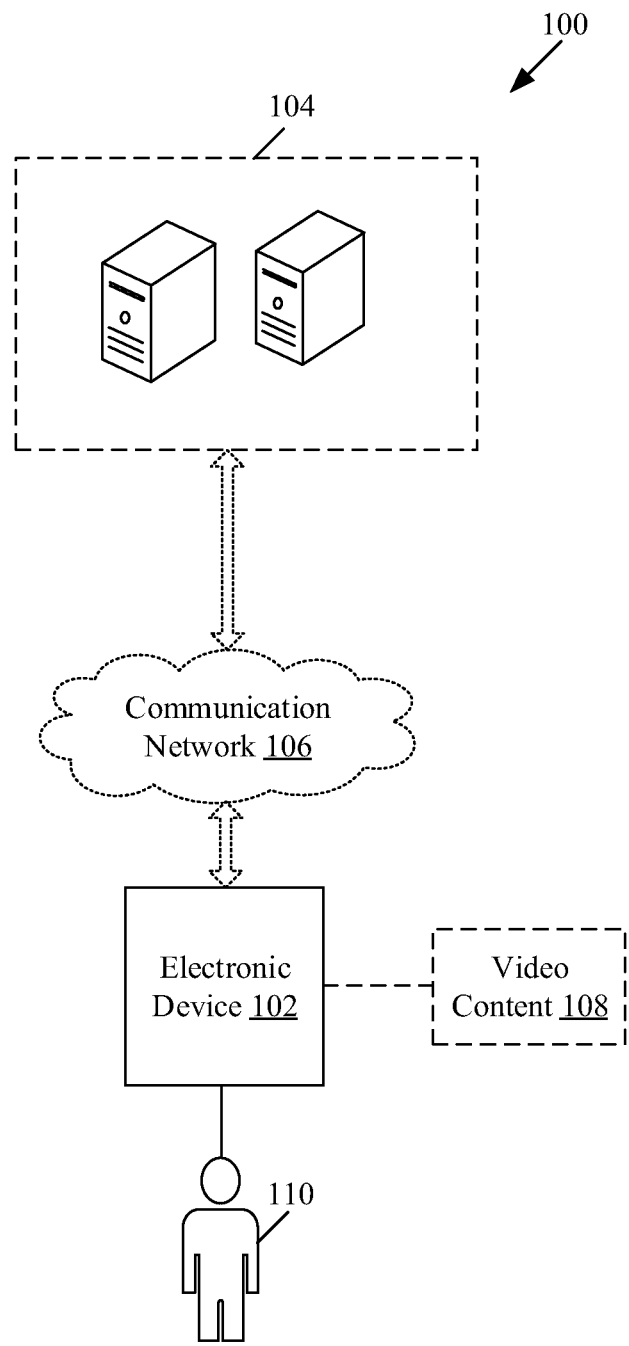
FIG. 1 is a block diagram that illustrates an exemplary network environment for object tracking in video content, in accordance with an embodiment of the disclosure.

The following described implementations may be found in the disclosed video processing system and method for object tracking in video content. Exemplary aspects of the disclosure may include a video processing method implemented in an electronic device that may include one or more circuits. The video processing method may capture a sequence of image frames of the video content. The captured sequence of image frames of the video content may include at least a current image frame and a previous image frame that comprises at least an object. The video processing method may further detect a current state of the object in the current image frame from the sequence of image frames based on a plurality of first parameters. The video processing method may further adjust a plurality of second parameters for computation of a plurality of features of the object in the current image frame, based on the detected current state. The video processing method may further track the object in the current image frame based on a first feature of the computed plurality of features the object in the current image frame.

In accordance with an embodiment, the plurality of first parameters may include an appearance similarity score and a template matching score. The template matching score is a value that may be derived based on a similarity score between one or more object features of the object in the current image frame and one or more object features of the object in the previous image frame and a specified constant factor. The appearance similarity score is a value that may be derived based on a difference between a first color distribution of the object in the current image frame and a second color distribution of one or more object features of the object in the previous image frame and a specified coefficient value.

In accordance with an embodiment, the detected current state may correspond to one of four distinct states: a normal state, an occlusion state, a reacquisition state, or a deformation state. The detected current state may correspond to the normal state or a first reacquisition state, in an event that a corresponding appearance similarity score exceeds a first specified threshold value, and a corresponding template matching score exceeds a second specified threshold value. The normal state refers to a state of the object in an image, such as the current image frame, in an event that the object is completely and clearly visible in the image. In the normal state, one or more regions of the object in the image may not be occluded. In other words, the one or more regions of the object in the image may not be hidden by other objects present in the image providing a clear view of the object to be tracked in the image. The detected current state may correspond to the occlusion state or a second reacquisition state, in an event that a corresponding appearance similarity score is less than the first specified threshold value, and a corresponding template matching score is less than the second specified threshold value. The occlusion state refers to a state of the object in an image, such as the current image frame, in an event that the object is partially visible or hidden by another object or has exited the frame. In the occlusion state, one or all regions of the object in the image may be occluded. In other words, the one or more regions of the object in the image may be hidden by other objects present in the image thereby not providing a clear view of the object to be tracked in the image or subsequent images. The reacquisition state refers to a state of the object in an image, such as the current image frame, in an event of a transition from the occlusion state to the normal state. In the reacquisition state, one or more regions of the object in the image may become partially visible. The detected current state may correspond to the deformation state, in an event that a corresponding appearance similarity score exceeds the first specified threshold value, and a corresponding template matching score is less than the second specified threshold value. The deformation state refers to a state of the object in an image, such as the current image frame, when the object is associated with non-rigid deformations, such as rotation, shear, extension and compression, in the image. In other words, the object may be in a different shape, such as a deformed shape or structure, in the current image frame as compared to a previous image frame.

In accordance with an embodiment, the video processing method may further determine a state transition of the object from a first state of the object in the previous image frame to a second state of the object in the current image frame based on change in values of the plurality of first parameters. In accordance with an embodiment, the video processing method may compute the first feature of the plurality of features of the object in the current image frame based on a similarity score between one or more object features of the object in the current image frame and one or more object features of the object in the previous image frame, and a first parameter of the plurality of second parameters. In accordance with an embodiment, the one or more circuits may be further configured to compute a second feature of the plurality of features of the object in the current image frame based the one or more object features of the object in the current image frame, one or more object features of the object in the previous image frame, and a second parameter of the plurality of second parameters.

In accordance with an embodiment, the first parameter of the plurality of second parameters may correspond to a search area in the current image frame that is adjusted based on the detected current state of the object. In accordance with an embodiment, the second parameter of the plurality of second parameters may correspond to a learning rate that is adjusted based on the detected current state of the object.

FIG. 1 is a block diagram that illustrates an exemplary network environment for object tracking in video content, in accordance with an embodiment of the disclosure. With reference to FIG. 1, there is shown an exemplary network environment 100. The exemplary network environment 100 may correspond to an exemplary network system. The exemplary network environment 100 may include an electronic device 102, one or more cloud resources, such as a server 104, and a communication network 106. There is further shown video content 108 and one or more users, such as a user 110. With reference to FIG. 1, the electronic device 102 may be communicatively coupled to the server 104, via the communication network 106. The user 110 may be associated with the electronic device 102. The video content 108 may be captured and/or processed by the electronic device 102.

The electronic device 102 may comprise suitable logic, circuitry, interfaces, and/or code that may be configured to communicate with the server 104, via the communication network 106. The electronic device 102 may further include circuitry that may be configured to track one or more objects in a sequence of image frames of video content, such as the video content 108. Examples of the electronic device 102 may include, but are not limited to, an imaging device (such as a camera or a camcorder), an image- or video-processing device, a motion-capture system, and/or a projector device.

The server 104 may comprise suitable logic, circuitry, interfaces and/or code that may be configured to communicate with the electronic device 102, via the communication network 106. The server 104 may be further configured to track one or more objects in video content, such as the video content 108. Examples of the server 104 may include, but are not limited to a web server, a database server, a file server, an application server, or a combination thereof. The server 104 may be implemented by use of several technologies that are well known to those skilled in the art.

The communication network 106 may include a medium through which the electronic device 102 and the server 104, may communicate with each other. The communication network 106 may be a wired or wireless communication network. Examples of the communication network 106 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

The video content 108 may comprise a sequence of image frames. The sequence of image frames may comprise at least a previous image frame and a current image frame that may include at least one object to be tracked. Examples of the at least one object to be tracked may include, but are not limited to, a human subject, a group of people, an animal, an article, an item of inventory, a vehicle, and/or other such physical entity. Notwithstanding, the disclosure may not be so limited and any other living and/or non-living thing may be tracked without limitation to the scope of the disclosure.

In accordance with an embodiment, the sequence of image frames of the video content 108 may be processed by the electronic device 102 to track the object in the current image frame. In accordance with another embodiment, the sequence of image frames of the video content 108 may be processed by the server 104. In such a case, the electronic device 102 may transmit the video content 108 to the server 104, via the communication network 106. The server 104 processes the video content 108 and returns the tracked object back to the electronic device 102, via the communication network 106. Examples of the video content 108 may include, but are not limited to, a pre-recorded video clip, a live multimedia recording, or audio-visual digital content captured in real-time.

In operation, the electronic device 102 may be configured to capture a sequence of image frames of video content, such as the video content 108. In an instance, the sequence of image frames of the video content 108 may be retrieved from local memory unit (not shown) of the electronic device 102. In another instance, the sequence of image frames of the video content 108 may correspond to multimedia content recorded in real-time by the electronic device 102. In yet another instance, the sequence of image frames of the video content 108 may correspond to audio-visual digital content captured in real-time by the electronic device 102.

In accordance with an embodiment, the sequence of image frames of the video content may include at least a current image frame and a previous image frame that comprises at least an object. In an instance, the object is in motion and the electronic device 102 is stationary. In another instance, the object is stationary and the electronic device 102 is in motion. The object, included in the previous image frame and the current image frame, may be associated with one or more deformations that may vary with respect to time. The object may be associated with a current state in the current image frame. In accordance with an embodiment, the current state may correspond to one of a normal state, an occlusion state, a reacquisition state, or a deformation state.

The electronic device 102 may be configured to compute a plurality of first parameters that include a template matching score and an appearance similarity score. In accordance with an embodiment, the template matching score is a value that may be derived based on a similarity score between one or more object features of the object in the current image frame and one or more object features, such as a template, of the object in the previous image frame, and a specified constant factor. The specified constant factor may correspond to a normalization factor that may be used to normalize the template matching score. In accordance with an embodiment, the appearance similarity score is a value that may be derived based on a difference between a first color distribution of the object in the current image frame and a second color distribution of one or more object regions in the previous image frame. The specified coefficient value may correspond to a Bhattacharyya coefficient or any other number of comparison methods between probability distributions. The color distributions may correspond to the color histograms that may represent the distribution of colors in an image frame.

The electronic device 102 may be configured to detect the current state of the object in the current image frame based on the computed plurality of first parameters. The detection of the current state of the object in the current image frame from the captured sequence of image frames is explained in detail, for example, in FIG. 2.

In accordance with an embodiment, the detected current state may correspond to the normal state or a first reacquisition state, in an event that a corresponding appearance similarity score exceeds a first specified threshold value, and a corresponding template matching score exceeds a second specified threshold value. The normal state refers to a state of the object in an image, such as the current image frame, in an event that the object is completely and clearly visible in the image. In the normal state, one or more regions of the object in the image may not be occluded. In other words, the one or more regions of the object in the image may not be hidden by other objects present in the image providing a clear view of the object to be tracked in the image. In accordance with an embodiment, the detected current state may correspond to the occlusion state or a second reacquisition state, in an event that a corresponding appearance similarity score is less than a first specified threshold value, and a corresponding template matching score is less than a second specified threshold value. The occlusion state refers to a state of the object in an image, such as the current image frame, in an event that the object is partially visible or non-visible in the image. In the occlusion state, one or more or all regions of the object in the image may be occluded. In other words, the one or more regions of the object in the image may be hidden by other objects present in the image or the object may have exited the frame thereby not providing a clear view of the object to be tracked in the image. The reacquisition state refers to a state of the object in an image, such as the current image frame, in an event that the object is returning from the occlusion state to the normal state. In the reacquisition state, one or more regions of the object in the image may be partially visible. In accordance with an embodiment, the detected current state may correspond to the deformation state, in an event that a corresponding appearance similarity score exceeds a first specified threshold value, and a corresponding template matching score is less than a second specified threshold value. The deformation state refers to a state of the object in an image, such as the current image frame, when the object is associated with non-rigid deformations, such as rotation, shear, extension and compression, in the image. In other words, the object may be in rotation in the image and may not be associated with rigid motion.

Based on the detected current state, the electronic device 102 may be further configured to adjust a plurality of second parameters for computation of a plurality of features of the object in the current image frame. The adjustment of the plurality of second parameters and computation of the plurality of features of the object in the current image frame is explained in detail, for example, in FIG. 2.

In accordance with an embodiment, a first parameter of the plurality of second parameters may correspond to a search area in the current image frame that is adjusted based on the detected current state of the object. In accordance with an embodiment, a second parameter of the plurality of second parameters may correspond to a learning rate that is adjusted based on the detected current state of the object.

In accordance with an embodiment, the one or more circuits may be further configured to compute the first feature of the plurality of features of the object in the current image frame based on a similarity score between one or more object features of the object in the current image frame and one or more object features, such as the template, of the object in a previous image frame and a first parameter of the plurality of second parameters, such as the search area. In accordance with an embodiment, the one or more circuits may be further configured to compute the second feature of the plurality of features of the object in the current image frame based the one or more object features of the object in the current image frame, one or more object features, such as the template, of the object in a previous image frame, and a second parameter of the plurality of second parameters, such as the learning rate.

The electronic device 102 may be further configured to track the object in the current image frame based on the first feature of the computed plurality of features of the object in the current image frame. In accordance with an embodiment, the electronic device 102 may be further configured to determine a state transition of the object from a first state of the object in the previous image frame to a second state of the object in the current image frame based on change in values of the plurality of first parameters.

In accordance with an embodiment, the determined state transition may be stored in a local memory unit (not shown) of the electronic device 102. The electronic device 102 may additionally be configured to utilize the stored state transition for detection of the current state of the object in the next subsequent image frames from the sequence of image frames of the video content.

In accordance with another aspect of the disclosure, the electronic device 102 may be configured to transmit the captured sequence of image frames to the server 104, via the communication network 106. The server 104 may be configured to detect the current state of the object in the current image frame from the captured sequence of image frames based on the plurality of first parameters. The server 104 may be further configured to adjust the plurality of second parameters for computation of the plurality of features of the object in the current image frame, based on the detected current state. The server 104 may be further configured to track the object in the current image frame based on the first feature of the computed plurality of features of the object in the current image frame. The server 104 may be further configured to transmit the tracked object in the current image frame to the electronic device 102, via the communication network 106.

Figure 2:
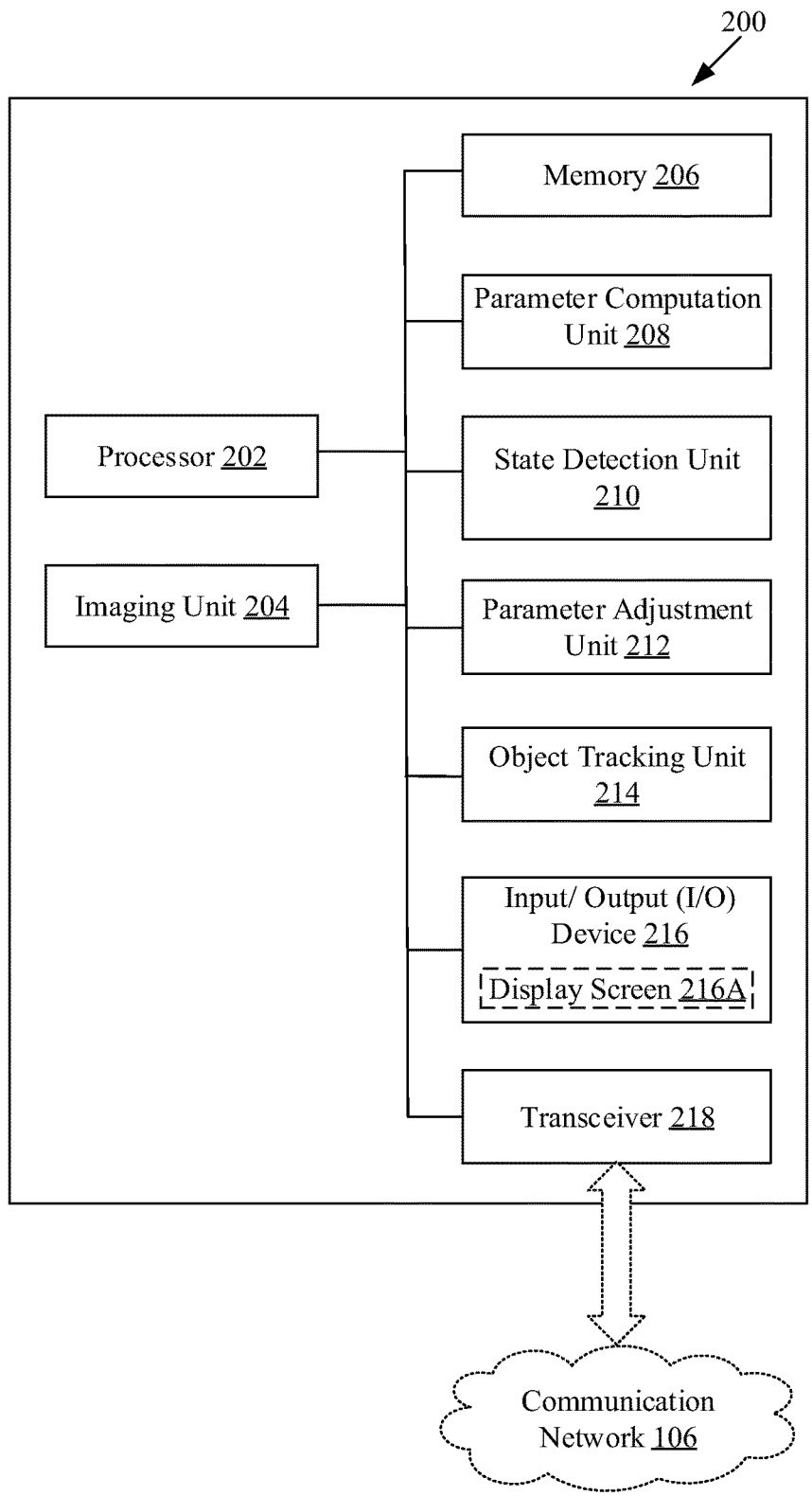
FIG. 2 is a block diagram of a video processing system for object tracking in video content, in accordance with an embodiment of the disclosure.

FIG. 2 is a block diagram of a video processing system for object tracking in a sequence of image frames, in accordance with an embodiment of the disclosure. FIG. 2 is described in conjunction with, for example, FIG. 1. With reference to FIG. 2, there is shown a block diagram 200 that may include one or more circuits configured for object tracking in the sequence of image frames. The one or more circuits may include a processor 202, an imaging unit 204, a memory unit 206, a parameter computation unit 208, a state detection unit 210, a parameter adjustment unit 212, an object tracking unit 214, one or more input/output (I/O) devices, such as an I/O device 216, and a transceiver 218. Further, the one or more I/O devices 216 may comprise a display screen 216A. There is further shown a communication network, such as the communication network 106 (FIG. 1).

As an exemplary embodiment, the block diagram 200 is shown to be implemented in an exemplary electronic device, such as the electronic device 102 (FIG. 1). However, in accordance with an embodiment, the block diagram 200 may be implemented in an exemplary server, such as the server 104 (FIG. 1), without deviation from the scope of the disclosure.

With reference to FIG. 2, the one or more circuits, such as the processor 202, the imaging unit 204, the memory unit 206, the parameter computation unit 208, the state detection unit 210, the parameter adjustment unit 212, the object tracking unit 214, the I/O device 216, and the transceiver 218 may be interconnected with each other. The transceiver 218 may be configured to communicate with the exemplary server, such as the server 104, via the communication network 106.

The processor 202 may comprise suitable logic, circuitry, interfaces, and/or code that may be operable to execute a set of instructions stored in the memory unit 206. The processor 202 may be further configured for object tracking in the sequence of image frames of video content, such as the video content 108 (FIG. 1). The processor 202 may be implemented based on a number of electronic control unit technologies, which are known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The imaging unit 204 may comprise suitable logic, circuitry, interfaces, and/or code that may be configured to capture the sequence of image frames of the video content, such as the video content 108. The sequence of image frames of the video content may include at least a current image frame and a previous image frame. The current image frame and a previous image frame may further include at least an object in motion. The imaging unit 204 may refer to an in-built camera or an image sensor of the electronic device 102. The imaging unit 204 may comprise a viewfinder that may be configured to compose and/or focus the view captured by the imaging unit 204. The imaging unit 204 may be configured to store the captured sequence of image frames of the video content 108 in a local buffer and/or the memory unit 206.

The memory unit 206 may comprise suitable logic, circuitry, interfaces, and/or code that may be operable to store a machine code and/or a computer program with at least one code section executable by the processor 202. The memory unit 206 may be further operable to store the sequence of image frames captured by the imaging unit 204. The memory unit 206 may be further operable to store operating systems and associated applications of the electronic device 102. Examples of implementation of the memory unit 206 may include, but are not limited to, Random Access Memory (RAM), Read Only Memory (ROM), Hard Disk Drive (HDD), Flash memory, and/or a Secure Digital (SD) card.

The parameter computation unit 208 may comprise suitable logic, circuitry, interfaces, and/or code that may be configured to compute a plurality of first parameters, such as an appearance similarity score and a template matching score. The parameter computation unit 208 may be implemented as a separate processor or circuitry in the electronic device 102. The parameter computation unit 208 and the processor 202 may be implemented as an integrated processor or a cluster of processors that perform the functions of the parameter computation unit 208 and the processor 202. The parameter computation unit 208 may be implemented as a set of instructions stored in the memory unit 206, which on execution by the processor 202 may perform the functions and operations of the electronic device 102.

The state detection unit 210 may comprise suitable logic, circuitry, interfaces, and/or code that may be configured to receive the output of the parameter computation unit 208. The output of the parameter computation unit 208 may comprise the plurality of first parameters. The state detection unit 210 may be configured to detect a current state of the object in the current image frame from the sequence of image frames based on the received plurality of first parameters. The state detection unit 210 may be implemented as a separate processor or circuitry in the electronic device 102. The state detection unit 210 and the processor 202 may be implemented as an integrated processor or a cluster of processors that perform the functions of the state detection unit 210 and the processor 202. The state detection unit 210 may be implemented as a set of instructions stored in the memory unit 206, which on execution by the processor 202 may perform the functions and operations of the electronic device 102.

The parameter adjustment unit 212 may comprise suitable logic, circuitry, interfaces, and/or code that may be configured to receive the output of the state detection unit 210. The parameter adjustment unit 212 may be further configured to adjust a plurality of second parameters based on the detected current state of the object in the current image frame. The parameter adjustment unit 212 may be implemented as a separate processor or circuitry in the electronic device 102. The parameter adjustment unit 212 and the processor 202 may be implemented as an integrated processor or a cluster of processors that perform the functions of the parameter adjustment unit 212 and the processor 202. The parameter adjustment unit 212 may be implemented as a set of instructions stored in the memory unit 206, which on execution by the processor 202 may perform the functions and operations of the electronic device 102.

The object tracking unit 214 may comprise suitable logic, circuitry, interfaces, and/or code that may be configured to receive the adjusted plurality of second parameters from the parameter adjustment unit 212. The object tracking unit 214 may be further configured to utilize the adjusted plurality of second parameters for computation of a plurality of features of the object in the current image frame of the sequence of image frames captured by the imaging unit 204. Further, the object tracking unit 214 may be operable to track the object in the current image frame based on the first feature of the computed plurality of features of the object in the current image frame. The object tracking unit 214 may be implemented as a separate processor or circuitry in the electronic device 102. The object tracking unit 214 and the processor 202 may be implemented as an integrated processor or a cluster of processors that perform the functions of the object tracking unit 214 and the processor 202. The object tracking unit 214 may be implemented as a set of instructions stored in the memory unit 206, which on execution by the processor 202 may perform the functions and operations of the electronic device 102.

The I/O device 216 may comprise suitable logic, circuitry, interfaces, and/or code that may be configured to control presentation of the tracked object on a display screen 216A. The display screen 216A may be realized through several known technologies, such as, but are not limited to, Liquid Crystal Display (LCD) display, Light Emitting Diode (LED) display, and/or Organic LED (OLED) display technology. The I/O device 216 may comprise various input and output devices and/or mechanisms that may be configured to communicate with the processor 202. Examples of the input devices or input mechanisms may include, but are not limited to, a shutter button, a record button on the electronic device 102 (such as a camera), a software button on a UI of the electronic device 102, the imaging unit 204, a touch screen, a microphone, a motion sensor, and/or a light sensor. Examples of the output devices may include, but are not limited to, the display screen 216A, a projector screen, and/or a speaker.

The transceiver 218 may comprise suitable logic, circuitry, interfaces, and/or code that may be configured to communicate with one or more cloud resources, such as the server 104 (as shown in FIG. 1), via the communication network 106 (as shown in FIG. 1). The transceiver 218 may implement known technologies to support wired or wireless communication of the electronic device 102 with the communication network 106. Components of the transceiver 218 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the processor 202 may be configured to capture a sequence of image frames of video content, such as the video content 108 (FIG. 1). In a certain case, the sequence of image frames of the video content may be retrieved from the memory unit 206 of the exemplary electronic device, such as the electronic device 102. In another instance, the sequence of image frames of the video content may correspond to multimedia content recorded in real-time in the memory unit 206. In yet another instance, the sequence of image frames of the video content may correspond to audio-visual digital content captured in real-time by the imaging unit 204. In such a case, the imaging unit 204 may be controlled based on an input signal received from a user, such as the user 110. The input signal may be provided by the user, via a selection of a graphical button rendered on the user interface (not shown) or a button-press event of a hardware button available at the electronic device 102.

In accordance with an embodiment, the sequence of image frames of the video content may include at least a current image frame and a previous image frame that comprises at least an object in motion. In accordance with an embodiment, the object in the previous image frame and the current image frame may be associated with one or more deformations that may vary with respect to time. Such one or more deformations may correspond to non-rigid deformations. In accordance with an embodiment, the object may be associated with a current state in the current image frame. In accordance with an embodiment, the current state of the object in the current image frame may correspond to one of a normal state, an occlusion state, a reacquisition state, or a deformation state.

The parameter computation unit 208 in conjunction with the processor 202 may be configured to compute a plurality of first parameters. In accordance with an embodiment, the plurality of first parameters may include a template matching score and an appearance similarity score.

In accordance with an embodiment, the template matching score is a value that may be derived based on a similarity score between one or more template-based object features of the target in the current image frame and one or more template-based object features of the target object in the previous image frame, and a specified constant factor. The specified constant factor may correspond to a normalization factor that may be used to normalize the template matching score. In accordance with an embodiment, the template matching score of the current image frame may correspond to a normalized similarity measure between the one or more object features, such as the template, of the object in the previous image frame and the one or more object features of the object in the current image frame. In other words, the normalized similarity measure may refer to a percentage value derived from a degree of similarity between the object in the previous image frame and the object in the current image frame. The template matching score may be represented by the following exemplary expression (1):

$$C_T = \frac{S(f(I(x_{k+1})) - f(T_k))}{N} \quad (1)$$

where,
$C_T$ corresponds to the template matching score of the current image frame;
N corresponds to the specified constant factor;
$f(I(x_{k+1}))$ corresponds to the one or more template-based features of the object in the current image frame;
$f(T_k)$ corresponds to the one or more object features, such as the template, of the object template created from the last appearance of the object; and
S corresponds to the similarity score between one or more object features of the object in the current image frame and one or more object features, such as the template matching scores like Normalized Cross Correlation, of the object in the previous image frame.

In accordance with an embodiment, the template matching score may be visualized by utilization of a graphical representation, such as a score surface (not shown). The score surface may be created by use of the similarity scores computed between one or more object features of the object in the current image frame and one or more object features, such as the template, of the object in the previous image frame. The highest peak in the score surface may correspond to the location of the object in the current image frame. The magnitude of the highest peak in the score surface indicates the certainty level associated with similarity of the object (to be tracked) in the current image frame with respect to the object in the previous image frame. The peaks other than the highest peak indicate reduced template matching score in the score surface that may be due the deformation state or the occlusion state of the object in the current image frame. So, it may be understood that the template matching score, as one of the plurality of first parameters, alone may not be sufficient to detect the current state of the object in the current image frame. Thus, an additional score, such as the appearance similarity score may be required to sufficiently detect the current state of the object in the current image frame.

In accordance with an embodiment, the appearance similarity score is a value that may be derived based on a difference between a first color distribution of the object in the current image frame and a second color distribution of the one or more object features, of the object in the previous image frame and a specified coefficient value. The specified coefficient value may correspond to a measure for comparing two probability distributions, such as the Bhattacharyya coefficient (or Bhattacharyya distance) between the first color distribution and the second color distribution. In fact, other such distribution similarity metrics may also be utilized as the specified coefficient value, without deviation from the scope of the disclosure.

Both the first color distribution and the second color distribution may correspond to the corresponding color histograms that may represent the distribution of colors in current image frame and the previous image frame respectively. The appearance similarity score using the Bhattacharyya coefficient may be represented by the following exemplary expression (2):

$$C_A = BC(h(I(x_{k+1})) - h(T_k)) \quad (2)$$

where, $C_A$ corresponds to the appearance similarity score;

BC corresponds to the Bhattacharyya distance operator;

h is an operator that extracts histogram features from an image patch;

$I(x_{k+1})$ corresponds to the image patch corresponding to the object in the current image frame;

$h(I(x_{k+1}))$ corresponds to the first color distribution of the object in the current image frame;

$T_k$ corresponds to the template of the object in the previous image frame; and $h(T_k)$ corresponds to the color distribution of the target object given all previous seen appearances of the target in the previous frames.

Thus, appearance similarity score which is based on color distributions along with the template matching score may be used for differentiating the occlusion state from the deformation state of the object in the current image frame. Thus, with the above computed plurality of first parameters by the parameter computation unit 208, accurate detection of the current state of the object in the current image frame may be achieved.

The state detection unit 210, in conjunction with the processor 202, may be configured to receive the output of the parameter computation unit 208. Based on the received plurality of first parameters computed by the parameter computation unit 208, the state detection unit 210 may be further configured to detect the current state of the object in the current image frame from the sequence of image frames captured by the imaging unit 204. The current state of the object in the current image frame may be detected based on the computed plurality of first parameters, such as the template matching score and the appearance similarity score, as shown in the following Table 1:

TABLE 1

| Current State of the object in the current image frame | Appearance similarity score ($C_A$) | Template matching score ($C_T$) |
| --- | --- | --- |
| Normal State | High ($C_A > L_A$) | High ($C_T > L_T$) |
| Occlusion State | Low ($C_A < L_A$) | Low ($C_T < L_T$) |
| Deformation State | High ($C_A > L_A$) | Low ($C_T < L_T$) |
| First Reacquisition State | Same as Normal state | Same as Normal state |
| Second Reacquisition State | Same as Occlusion state | Same as Occlusion state |

In accordance with an embodiment, with reference to Table 1, it may be observed that the detected current state may correspond to the normal state or a first reacquisition state, in an event that a corresponding appearance similarity score ($C_A$) exceeds a first specified threshold value ($L_A$), and a corresponding template matching score ($C_T$) exceeds a second specified threshold value ($L_T$). In accordance with an embodiment, with reference to Table 1, the detected current state may correspond to the occlusion state or a second reacquisition state, in an event that a corresponding appearance similarity score ($C_A$) is less than a first specified threshold value ($L_A$), and a corresponding template matching score ($C_T$) is less than a second specified threshold value ($L_T$). In accordance with an embodiment, with reference to Table 1, the detected current state may correspond to the deformation state, in an event that a corresponding appearance similarity score ($C_A$) exceeds a first specified threshold value ($L_A$), and a corresponding template matching score ($C_T$) is less than a second specified threshold value ($L_T$). In accordance with an embodiment, the first specified threshold value ($L_A$) and the second specified threshold value ($L_T$) may be determined experimentally and may be further dependent on the type of application and the type of similarity metric.

In accordance with an embodiment, the state detection unit 210 in conjunction with the processor 202 may be further configured to determine a state transition of the object from a first state of the object in the previous image frame to a second state of the object in the current image frame based on change in values of the computed plurality of first parameters, such as the template matching score and the appearance similarity score. In accordance with an embodiment, the first state and the second state of the object may correspond to one of a normal state, an occlusion state, a reacquisition state, or a deformation state. In accordance with an embodiment, the second state of the object in the current image frame may correspond to the current state of the object in the current image frame. The state transition of the object from the first state of the object in the previous image frame to the second state of the object in the current image frame may be determined by the state detection unit 210 in conjunction with the processor 202, as shown in the following Table 2:

change". Similar instances may be observed for the other states, such as the occlusion state, the reacquisition state and the deformation state.

TABLE 2

| | First State | | | |
|---|---|---|---|---|
| Second State | Normal State | Occlusion State | Reacquisition State | Deformation State |
| Normal State | No change | $C_A$ = HIGH and $C_T$ = HIGH | $C_A$ = HIGH and $C_T$ = HIGH and XN | $C_A$ = HIGH and $C_T$ = HIGH |
| Occlusion State | $C_A$ = LOW and $C_T$ = LOW | No change | No path | $C_A$ = LOW and $C_T$ = LOW |
| Reacquisition State | No path | $C_A$ = HIGH and $C_T$ = HIGH and XN | No change | No path |
| Deformation State | $C_A$ = HIGH and $C_T$ = LOW | $C_A$ = HIGH and $C_T$ = LOW | $C_A$ = HIGH and $C_T$ = LOW | No change |

With reference to Table 2, it may be observed that the state transition of the object from the normal state of the object in the previous image frame to the occlusion state of the object in the current image frame may occur, in an event the appearance similarity score changes from high to low and the template matching score changes from high to low. Similarly, the state transition of the object from the normal state of the object in the previous image frame to deformation state of the object in the current image frame may be observed due to changes in the appearance similarity score and the template matching score.

With reference to Table 2, it may be further observed that similar state transition of the object from the different first states of the object in the previous image frame to the different second states of the object in the current image frame may occur based on change in values of the plurality of first parameters, such as the template matching score and the appearance similarity score.

With reference to Table 2, it may be further observed that specifically, in an event the initial state of the object in the previous image frame corresponds to the reacquisition state and the next state of the object in the current image frame corresponds to the normal state, the state transition of the object may be based on an additional parameter in addition to the change in the value of the plurality of first parameters. In such an event, changes in the values of the plurality of first parameters, such as the template matching score and the appearance similarity score may be observed for a specific number of image frames, such as 10 frames. With reference to Table 2, it may be observed that the template matching score and the appearance similarity score remains high and the additional parameter "XN" may correspond to the number of frames necessary for a particular state to be declared valid. Similar changes may be observed in an event the state transition of the object occur from the occlusion state in the previous image frame to the reacquisition state in the current image frame.

With reference to Table 2, it may also be observed that the state transition remains unchanged, in an event the object corresponds to the first state and the second state is same for the object in the previous image frame and the current image frame. For example, with reference to Table 2, in an event the object remains in the normal state in both the previous image frame and the current image frame, the state transition is determined to be unchanged and hence referred as "No With reference to Table 2, it may be further observed that the state transition of the object from the normal state in the previous image frame to the reacquisition state in the current image frame is not possible and hence referred as "No path". Similarly, from Table 2, it may be observed that "No path" exists between the object from the reacquisition state in the previous image frame to the occlusion state in the current image frame and also between the object from the deformation state in the previous image frame and the reacquisition state in the current image frame.

With reference to Table 2, it may be observed that in an event the object associated with the normal state in the previous image frame may result in the state transition to the object in the occlusion state or the deformation state in the current image frame. Further, in an event the object associated with the occlusion state in the previous image frame may result in the state transition to the object in the normal state, the reacquisition state or the deformation state in the current image frame. Further, in an event the object associated with the reacquisition state in the previous image frame may result in the state transition to the object in the normal state or the deformation state in the current image frame. Further, in an event the object associated with the deformation state in the previous image frame may result in the state transition to the object in the normal state or the occlusion state in the current image frame.

In accordance with an embodiment, the state transition may be associated with a transition probability, represented by the following exemplary expression (3):

$$P_{ij}(X_{k+1}=j|X_k=i,\overline{C_A},\overline{C_T}) \qquad (3)$$

where, $\overline{C_A}$ corresponds to discretized appearance similarity score; $\overline{C_T}$ corresponds to discretized template matching score;

k and k+1 correspond to a previous time instance and a current time instance, respectively;

$X_k$ corresponds to the state of the object in the previous image frame (or the first state);

$X_{k+1}$ corresponds to the state of the object in the current image frame (or the second state);

i and j correspond to one of the states of the object in the previous image frame and the current image frame, respectively; and $P_{ij}$ corresponds to the transition probability from state i to state j.

In accordance with an embodiment, the transition probability may be computed based on the discretized values of the appearance similarity score and the template matching score. The discretization of the appearance similarity score and the template matching score may depend on their relationship with the first specified threshold value ($L_A$) and the second specified threshold value ($L_T$) respectively.

In accordance with an embodiment, the transition probability may be independent of the discretized values of the appearance similarity score and the template matching score. In such a case, the transition probability denotes the likelihood or transition of the object from one state to another state. However, similar to the specified threshold values, the transition probability value may be learned by training.

In accordance with an embodiment, the determined state transition may be stored in the memory unit 206. The state detection unit 210 may additionally be configured to utilize the stored state transition for detection of the current state of the object in the next subsequent image frames from the sequence of image frames of the video content. Further, the stored state transition in the memory unit 206 may be utilized for the adjustment of a plurality of second parameters.

The parameter adjustment unit 212 may be configured to receive the current state of the object in the current image frame detected by the state detection unit 210. Based on the detected current state of the object in the current image frame, the parameter adjustment unit 212 may be further configured to adjust the plurality of second parameters. In accordance with an embodiment, a first parameter of the plurality of second parameters may correspond to a search area in the current image frame that is adjusted based on the detected current state of the object in the current image frame. In accordance with an embodiment, a second parameter of the plurality of second parameters may correspond to a learning rate (θ) that is adjusted based on the detected current state of the object in the current image frame. The plurality of second parameters, such as the search area and the learning rate, may be adjusted based on the detected current state, as shown in the following Table 3:

TABLE 3

| Plurality of second parameters | Detected Current State | | | |
| --- | --- | --- | --- | --- |
| | Normal State | Occlusion State | Reacquisition State | Deformation State |
| Search Area | D | D | All of current image frame | D |
| Learning rate | θ = α | θ = 0 | θ = 0 | θ = α * M |

In accordance with an embodiment, with reference to Table 3, it may be observed that in an event the detected current state corresponds to the normal state, the occlusion state or the deformation state, the search area may be adjusted to correspond to the area (D) associated with the object in the current image frame. In accordance with an embodiment, with reference to Table 3, it may be further observed that in an event the detected current state corresponds to the reacquisition state, normal state, the occlusion state or the deformation state, the search area may correspond to the whole or complete area of the current image frame.

In accordance with an embodiment, with reference to Table 3, it may be observed that in an event the detected current state corresponds to the normal state, the learning rate may be adjusted to correspond to a specific constant factor (a). In accordance with an embodiment, with reference to Table 3, it may be further observed that in an event the detected current state corresponds to the occlusion state or the reacquisition state, the learning rate may be adjusted to correspond to zero. In accordance with an embodiment, with reference to Table 3, it may be further observed that in an event the detected current state corresponds to the deformation state, the learning rate may correspond to an increased specific constant factor (a) with a multiplication factor (M).

The object tracking unit 214 may be configured to receive the adjusted plurality of second parameters from the parameter adjustment unit 212. The object tracking unit 214 may be further configured to utilize the adjusted plurality of second parameters for computation of a plurality of features of the object in the current image frame of the sequence of image frames captured by the imaging unit 204.

In accordance with an embodiment, the object tracking unit 214 may be configured to compute a first feature of the plurality of features of the object in the current image frame based on a similarity score between one or more object features of the object in the current image frame and one or more object features, such as the template, of the object in a previous image frame and a first parameter of the plurality of second parameters, such as the search area. In accordance with an embodiment, the first feature of the plurality of features of the object in the current image frame may correspond to the location of the object in the current image frame. The location of the object in the current image frame may be computed by maximizing the similarity score between the one or more object features of the object in the current image frame and the one or more object features, such as the template or histograms, of the object in a previous image frame. The maximization of the similarity score between the one or more object features of the object in the current image frame and the one or more object features, such as the template, of the object in a previous image frame may be represented by the following exemplary expression (3):

$$x_{k+1} = \underset{X \in D}{\mathrm{argmax}} S(f(I(x)) - f(T)) \quad (3)$$

where, $x_{k+1}$ corresponds to location of the object in the current image frame;

S corresponds to the similarity score between the one or more object features of the object in the current image frame and the one or more object features, such as the template or histograms, of the object in a previous image frame;

D corresponds to the search area in the current image frame;

I(x) corresponds to the image patch corresponding to the object in the current image frame;

f(I(x)) corresponds to the one or more object features of the object in the current image frame, this could either be template features or histograms; and f(T) corresponds to the one or more object features, such as the template or histograms, of the object template as obtained from the previous image frame.

In accordance with an embodiment, the object tracking unit 214 may be further configured to compute the second feature of the plurality of features of the object in the current image frame based the one or more object features of the object in the current image frame, one or more object features, such as the template, of the object in a previous image frame, and the second parameter of the plurality of second parameters, such as the learning rate. In accordance with an embodiment, the second feature of the plurality of features of the object in the current image frame may correspond to an updated template. The updated template may be associated with the object in the current image frame. The computation of updated template by the object tracking unit 214 may be represented by the following exemplary expression (4):

$$T_{k+1} = \theta(f(I(x_{k+1}))) + (1-\theta)T_k \qquad (4)$$

where, $T_{k+1}$ corresponds to the updated template, representing the current model of the target;

Θ corresponds to the learning rate;

$f(I(x_{k+1}))$ corresponds to the one or more object features of the object in the current image frame; and $T_k$ corresponds to the one or more object features, such as the template, of the object in the previous image frame.

Further, the object tracking unit 214 may be operable to track the object in the current image frame based on the first feature of the computed plurality of features of the object in the current image frame. In accordance with an embodiment, the object in the current image frame may be tracked based on the location of the object as computed above based on exemplary expression (3). In accordance with an embodiment, the tracking of the object in the current image frame may further depend on the detected current state, as shown in following Table 4:

TABLE 4

| Parameter | Normal State | Occlusion State | Reacquisition State | Deformation State |
|---|---|---|---|---|
| Location of the object | Exemplary Expression (3) | Exemplary Expression (3) | NULL | Exemplary Expression (3) |

In accordance with an embodiment, the object tracking unit 214 in conjunction with the processor 202 may be further configured to check the accuracy of the object tracked in the current image frame. In accordance with an embodiment, in an event that the computed similarity score between the one or more object features of the object in the current image frame and the one or more object features, such as the template, of the object in a previous image frame, as described above in exemplary expression (3), exceeds a specified third threshold value. In such a case, it may be considered that the tracking of the object is accurate and the tracked location of the object in the current image frame is correct. The tracking of the object in the current image frame may be considered as inaccurate, in an event that the computed similarity score between the one or more object features of the object in the current image frame and the one or more object features, such as the template or histograms, of the object in a previous image frame, as described above in exemplary expression (3), is less than the specified third threshold value. Such an event may occur due to insufficient matching of the object between the current image frame and the previous image frame. In such a case, it may be considered that the tracking of the object is inaccurate and the tracked location of the object in the current image frame is incorrect.

In accordance with an embodiment, the display screen 216A included in the I/O device 216, in conjunction with the object tracking unit 214 and the processor 202 may be configured to display the tracked object in the current image frame on the display screen 216A. In accordance with an embodiment, the memory unit 206 in conjunction with the processor 202 may be configured to store the tracked object in the current image frame. In accordance with an embodiment, the transceiver 218 may be configured to transmit the tracked at least one object to one or more cloud resources, such as the server 104 (FIG. 1), via the communication network 106 (FIG. 1).

Figure 3:
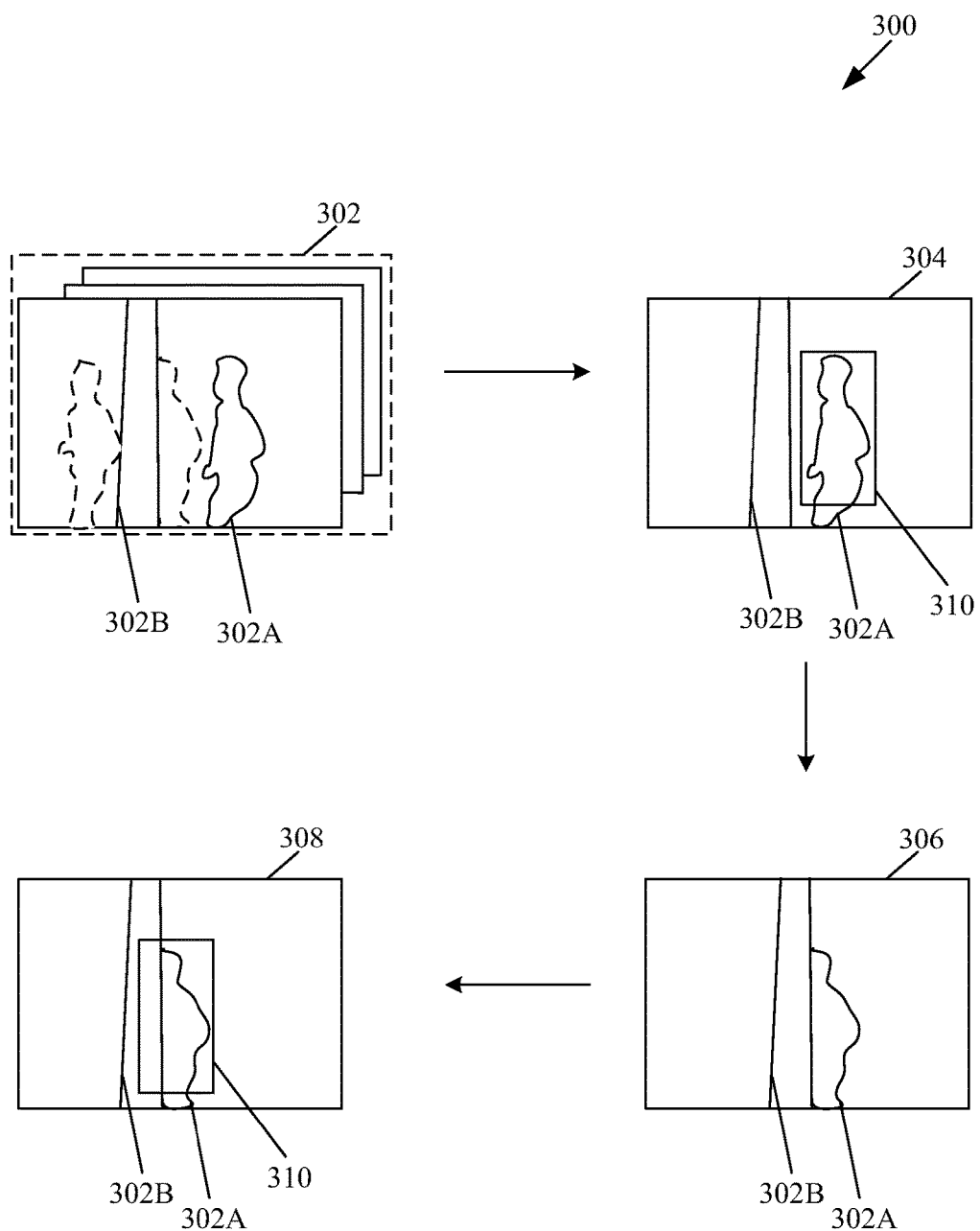
FIG. 3 illustrates an exemplary scenario for object tracking in video content, in accordance with an embodiment of the disclosure.

FIG. 3 illustrates an exemplary scenario for object tracking in video content, in accordance with an embodiment of the disclosure. With reference to FIG. 3, there is shown an exemplary scenario 300 of a scene that includes a pedestrian 302A walking past a traffic signal pole 302B. The exemplary scenario 300 is described in conjunction with, for example, FIG. 2.

With reference to the exemplary scenario 300, there is shown a sequence of image frames 302 that may be captured by the imaging unit 204 of the electronic device 102, such as a camcorder. The sequence of image frames 302 may correspond to the video content 108, as described in FIG. 1. The sequence of image frames 302 may include at least a previous image frame 304 and a current image frame 306. The sequence of image frames 302 may include an object, such as the pedestrian 302A, that may be associated with different states in different image frames. For example, the pedestrian 302A in the previous image frame 304 may correspond to a first state and the pedestrian 302A in the current image frame 306 may correspond to a second state. The second state may correspond to the current state. There is further shown a modified image frame 308. The modified image frame 308 that corresponds to the current image frame 306 and includes a rectangular boundary 310. The rectangular boundary 310 corresponds to a tracker for the pedestrian 302A in the current image frame 306.

With reference to the exemplary scenario 300, the imaging unit 204 may be configured to capture the sequence of image frames 302 of the scene that includes the pedestrian 302A walking past the traffic signal pole 302B. The parameter computation unit 208 in conjunction with the processor 202 may be configured to compute a plurality of first parameters associated with the current image frame 306. The plurality of first parameters may include a template matching score and an appearance similarity score. Both the template matching score and the appearance similarity score may be computed based on exemplary expressions (1) and (2), as described in FIG. 2

Based on the computed plurality of first parameters, the state detection unit 210 in conjunction with the processor 202 may be configured to detect the current state of the pedestrian 302A in the current image frame 306. The current state of the pedestrian 302A in the current image frame 306 may be detected based on the computed plurality of first parameters, such as the template matching score and the appearance similarity score, according to Table 1, as described in FIG. 2.

In accordance with an instance, the pedestrian 302A may be associated with the normal state in the previous image frame 304. Due to changes in the computed plurality of parameters, such as conversion of the template matching score and the appearance similarity score from high to low, the pedestrian 302A may be associated with the occlusion state in the current image frame 306. The state detection unit 210 in conjunction with the processor 202 may be configured to determine a state transition of the pedestrian 302A from the first state, i.e. the normal state, in the previous image frame 304 to the second state, i.e. the occluded state, in the current image frame 306. The state transition of the pedestrian 302A in the previous image frame 304 to the current image frame 306 may be determined according to Table 2, as described in FIG. 2.

The parameter adjustment unit 212 in conjunction with the processor 202 may be configured to adjust a plurality of second parameters based on the detected current state, such as the occlusion state. The plurality of second parameters may comprise a search area in the current image frame 306 and the learning rate. Both the search area and the learning rate may be adjusted based on the detected current state according to Table 3, as described in FIG. 2.

The object tracking unit 214 in conjunction with the processor 202 may be configured to utilize the plurality of second parameters, such as the search area and the learning rate, adjusted by the parameter adjustment unit 212 for computation of a plurality of features of the pedestrian 302A in the current image frame 306. The plurality of features, such as a location of the pedestrian 302A in the current image frame 306 and an updated template, may be computed based on exemplary expressions (3) and (4), respectively, as described in FIG. 2.

The object tracking unit 214 in conjunction with the processor 202 may be further configured to track the pedestrian 302A in the current image frame 306 based on a first feature of the computed plurality of features, such as the location of the pedestrian 302A, in the current image frame 306. In accordance with the exemplary scenario, the tracking of the pedestrian 302A may further depend on the detected current state, according to Table 4, as described in FIG. 2.

In accordance with the exemplary scenario, the object tracking unit 214 in conjunction with the processor 202 may be further configured to check the accuracy of the pedestrian 302A tracked in the current image frame 306. In an event, the computed similarity score between the one or more object features of the pedestrian 302A in the current image frame 306 and the one or more object features, such as the template, of the pedestrian 302A in the previous image frame 304, as described above in exemplary expression (3), exceeds a specified third threshold value. In such a case, it may be considered that the tracking of the pedestrian 302A is accurate and the tracked location of the pedestrian 302A in the current image frame 306 is correct.

The object tracking unit 214 in conjunction with the processor 202 may be further configured to generate a modified image frame 308 that corresponds to the current image frame 306 and includes the rectangular boundary 310 that encloses the pedestrian 302A. Thus, the pedestrian 302A is tracked accurately in the current image frame 306 without any drift. The modified image frame 308 (with the tracked pedestrian 302A) may be displayed on the display screen 216A of the camcorder.

Figure 4:
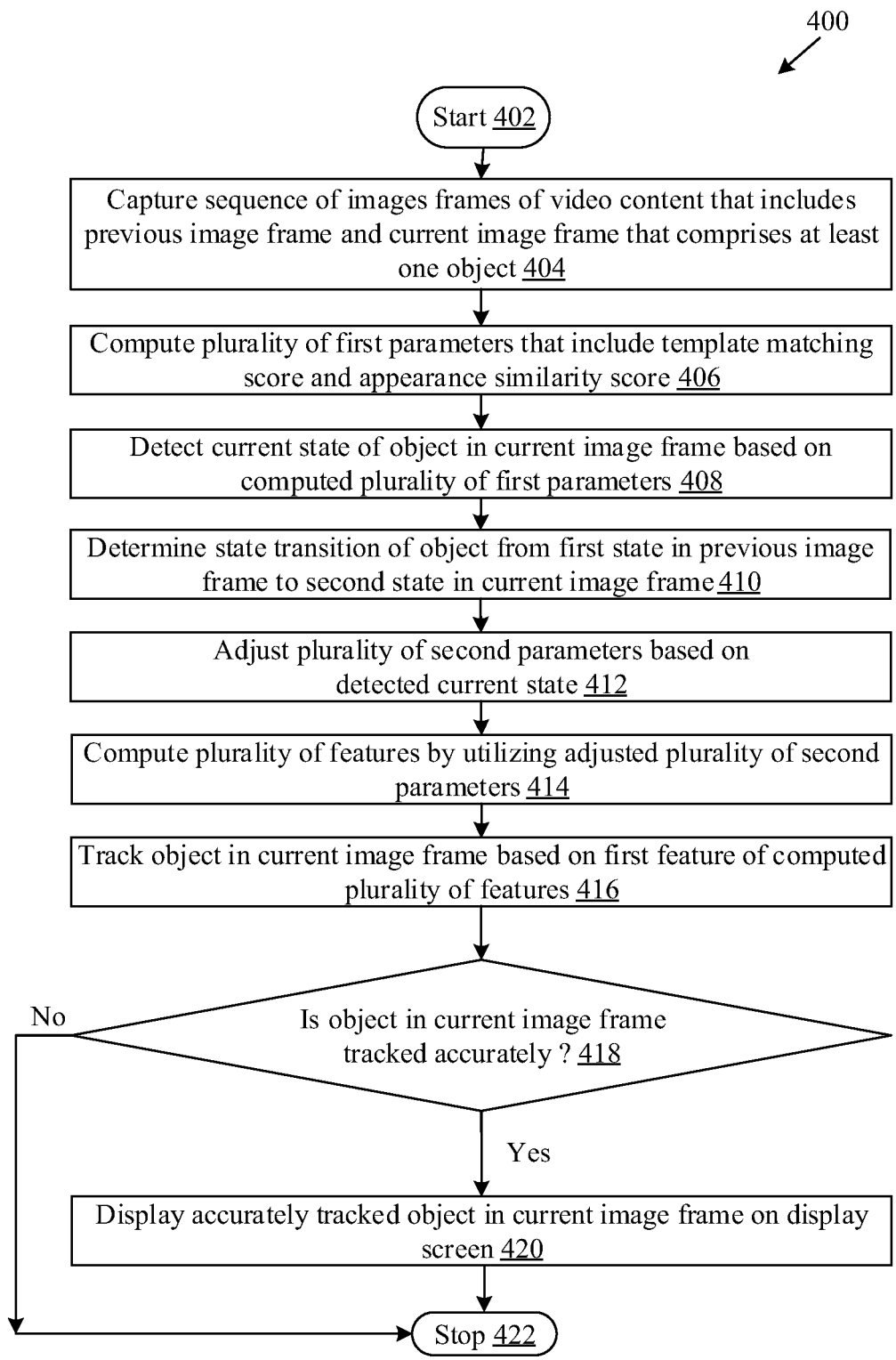
FIG. 4 is a flow chart that illustrates a video processing method for object tracking in video content, in accordance with an embodiment of the disclosure.

FIG. 4 is a flow chart that illustrates a video processing method for object tracking in video content, in accordance with an embodiment of the disclosure. With reference to FIG. 4, there is shown a flowchart 400. The flowchart 400 is described in conjunction with, for example, FIG. 2. The method starts at 402 and proceeds to 404.

At 404, a sequence of image frames of video content that includes a previous image frame and a current image frame that comprises at least an object may be captured. In accordance with an embodiment, the processor 202 may be configured to capture the sequence of image frames of the video content, such as the video content 108, by use of the imaging unit 204. In accordance with an embodiment, the captured sequence of image frames of the video content may be retrieved from the memory unit 206 of the electronic device 102. In accordance with an embodiment, the object may be associated with a current state in the current image frame. In accordance with an embodiment, the current state of the object in the current image frame may correspond to one of a normal state, an occlusion state, a reacquisition state, or a deformation state.

At 406, a plurality of first parameters that include a template matching score and an appearance similarity score may be computed. In accordance with an embodiment, the parameter computation unit 208 in conjunction with the processor 202 may be configured to compute the plurality of first parameters that may include the template matching score and the appearance similarity score. The template matching score and the appearance similarity score may be determined based on the exemplary expressions (1) and (2) respectively, as described in FIG. 2.

At 408, current state of the object in the current image frame may be detected, based on the computed plurality of first parameters. In accordance with an embodiment, the state detection unit 210 in conjunction with the processor 202 may be configured to detect the current state of the object in the current image frame from the captured sequence of image frames. With reference to Table 1, as described in FIG. 2, the current state of the object in the current image frame may be detected based on the computed plurality of first parameters, such as the template matching score and the appearance similarity score.

At 410, a state transition of the object from a first state of the object in the previous image frame to a second state of the object in the current image frame may be determined. In accordance with an embodiment, the state detection unit 210 in conjunction with the processor 202 may be configured to determine the state transition of the object from the first state of the object in the previous image frame to the second state of the object in the current image frame based on change in values of the computed plurality of first parameters, such as the template matching score and the appearance similarity score. In accordance with an embodiment, the first state and the second state of the object may correspond to one of a normal state, an occlusion state, a reacquisition state, or a deformation state. In accordance with an embodiment, the second state of the object in the current image frame may correspond to the current state of the object in the current image frame. The state transition of the object in the previous image frame to the current image frame may be determined according to Table 2, as described in FIG. 2.

At 412, a plurality of second parameters, such as a search area and a learning rate, may be adjusted based on the detected current state. In accordance with an embodiment, the parameter adjustment unit 212 may be configured to adjust the plurality of second parameters, based on the current state of the object in the current image frame, detected by the state detection unit 210. In accordance with an embodiment, the plurality of second parameters may include the search area in the current image frame and the learning rate. In accordance with an embodiment, the plurality of second parameters, such as the search area and the learning rate, may be adjusted according to Table 3, as described in FIG. 2.

At 414, a plurality of features, such as a location of the object and an updated template, may be computed, based on utilization of the adjusted plurality of second parameters. In accordance with an embodiment, the object tracking unit 214 may be configured to compute the first feature of the plurality of features of the object in the current image frame based on a similarity score between one or more object features of the object in the current image frame and one or more object features, such as the template, of the object in the previous image frame and a first parameter of the plurality of second parameters, such as the search area. In accordance with an embodiment, the first feature of the plurality of features of the object in the current image frame may correspond to the location of the object in the current image frame. The location of the object in the current image frame may be computed by maximizing the similarity score between the one or more object features of the object in the current image frame and the one or more object features, such as the template, of the object in the previous image frame based on exemplary expression (3), as described in FIG. 2.

In accordance with an embodiment, the object tracking unit 214 may be further configured to compute the second feature of the plurality of features of the object in the current image frame based the one or more object features of the object in the current image frame, one or more object features, such as the template, of the object in the previous image frame, and a second parameter of the plurality of second parameters, such as the learning rate. In accordance with an embodiment, the second feature of the plurality of features of the object in the current image frame may correspond to an updated template. The updated template may be associated with the object in the current image frame. The computation of updated template by the object tracking unit 214 may be based on the exemplary expression (4), as described in FIG. 2.

At 416, the object in the current image frame may be tracked based on a first feature of the computed plurality of features. In accordance with an embodiment, the object tracking 215 may be further configured to the track the object in the current image frame based on the first feature of the computed plurality of features, such as the location of the object, computed based on exemplary expression (3), as described in FIG. 2. In accordance with an embodiment, the tracking of the object in the current image frame may further depend on the detected current state, according to Table 4, as described in FIG. 2.

At 418, it may be determined whether the object is tracked accurately in the current image frame. In accordance with an embodiment, the object tracking unit 214 in conjunction with the processor 202 may be further configured to check the accuracy of the object being tracked in the current image frame. In an instance, in an event that the computed similarity score between the one or more object features of the object in the current image frame and the one or more object features, such as the template, of the object in a previous image frame, based on exemplary expression (3), as described in FIG. 2, exceeds a specified third threshold value, control passes to 420. In another instance, in an event that the computed similarity score between the one or more object features of the object in the current image frame and the one or more object features, such as the template, of the object in a previous image frame, based on exemplary expression (3), as described, for example, in FIG. 2, is less than the specified third threshold value. Such an event may occur due to insufficient matching between the object in the current image frame and the object in the previous image frame. For such an instance, it may be considered that the tracking of the object is inaccurate and the tracked location of the object in the current image frame is incorrect. The control passes to end 422.

At 420, in an event that the similarity score between the one or more object features of the object in the current image frame and the one or more object features, such as the template, of the object in a previous image frame exceeds the specified third threshold value, it may be considered that the object in the current image frame is tracked accurately. The tracked object in the current image frame may be displayed on the display screen. In accordance with an embodiment, the display screen 216A included in the I/O device 216, in conjunction with the object tracking unit 214 and the processor 202 may be configured to display the tracked object in the current image frame on the display screen 216A. Control passes to end 422.

Various embodiments of the disclosure encompass numerous advantages that includes a video processing system and method for object tracking in a sequence of image frames. The video processing system and method for object tracking, as disclosed herein, overcomes various issues as experienced by standard object tracking techniques. Such standard object tracking techniques may be based on a single set of parameters, regardless of the state of the object and the scenario in consideration. For example, in one scenario, the standard object tracking techniques may fail in an event that the features are "spatially sensitive" and a deformation associated with an object may cause a similarity metric to lose discriminability. In another scenario, the standard object tracking techniques may fail in an event that the similarity is maximized without considering the possibility that the object is occluded in subsequent image frame. Thus, such standard object tracking techniques may fail to accurately track the objects associated with deformations and occlusions, while increasing overall computational complexity and causing drift issues.

The aforementioned two issues may be overcome by the video processing system and method for object tracking, as disclosed herein, due to multi-state tracking of objects based on an internal state transition table. In other words, the disclosed video processing system and method detects the current state of the four discrete states of the object in the current image frame (by use of the template matching score and the appearance similarity score) and adjusts the tracking parameters accordingly. Consequently, the disclosed video processing system and method handles the four discrete states of objects separately in order exhibit robustness with respect to the aforementioned two scenarios. More specifically, the disclosed video processing system and method replaces the raw pixel values (of the plurality of pixels in the current image frame) with the likelihood values (of the plurality of pixels in the modified current image frame). Such likelihood values are relatively same for the objects to be tracked in the current image frame, thereby enhances the robustness of the video processing system.

Consequently, the video processing system and method, as disclosed herein, reduces overall computational complexity, enables the object tracking for longer duration of time, and exhibits additional robustness with respect to variations in the appearance of the object. The disclosed video processing method and system may be implemented in various application areas, such as video surveillance technique, object recognition technique, background subtraction technique, foreground detection technique, and/or the like.

In accordance with an embodiment of the disclosure, a video processing system for object tracking in video content is disclosed. The electronic device 102 (FIG. 1) may comprise one or more circuits, such as the state detection unit 210 (FIG. 2), that may be configured to detect a current state of an object in a current image frame from a sequence of image frames of video content, such as the video content 108, based on a plurality of first parameters. The electronic device 102 may comprise one or more circuits, such as the parameter adjustment unit 212 (FIG. 2), that may be configured to adjust a plurality of second parameters associated with the current image frame for computation of a plurality of features of the object in the current image frame, based on the detected current state. The electronic device 102 may comprise one or more circuits, such as the object tracking unit 214 (FIG. 2), that may be configured to track the object in the current image frame based on a first feature of the computed plurality of features of the object in the current image frame.

Various embodiments of the disclosure may provide a non-transitory computer-readable medium and/or storage medium, wherein there is stored thereon, a machine code and/or a computer program with at least one code section executable by a machine and/or a computer to detect objects in motion. The at least one code section in the electronic device 102 may cause the machine and/or computer to perform the steps that comprise detection of a current state of an object in a current image frame from a sequence of image frames based on a plurality of first parameters. The electronic device 102 may be further configured to adjust a plurality of second parameters associated with the current image frame for computation of a plurality of features of the object in the current image frame, based on the detected current state. The electronic device 102 may be further configured to track the object in the current image frame based on a first feature of the computed plurality of features of the object in the current image frame.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A video processing system, comprising:
one or more circuits in an electronic device, wherein said one or more circuits are configured to:
capture a sequence of image frames of video content, wherein said sequence of image frames comprises at least a previous image frame and a current image frame, wherein each of said current image frame and said previous image frame comprises at least one object, and wherein said at least one object is in motion;
determine a template matching score based on a similarity score between at least one feature of said at least one object in said current image frame and at least one feature of said at least one object in said previous image frame;
determine an appearance similarity score based on a difference between a first color distribution of said at least one object in said current image frame and a second color distribution of said at least one feature of said at least one object in said previous image frame;
determine a current state of said at least one object in said current image frame based on said appearance similarity score and said template matching score,
wherein said determined current state corresponds to one of a normal state, an occlusion state, a first reacquisition state or a deformation state;
adjust a plurality of parameters associated with said current image frame based on said determined current state;
compute a plurality of features of said at least one object in said current image frame based on said adjusted plurality of parameters; and
track said at least one object in said current image frame based on a first feature of said computed plurality of features of said at least one object in said current frame.

2. The video processing system according to claim 1, wherein said one or more circuits are further configured to determine said current state as the occlusion state based on said appearance similarity score that is less than a first determined threshold value, and said template matching score that is less than a second determined threshold value.

3. The video processing system according to claim 1, wherein said one or more circuits are further configured to determine said current state as the deformation state based on said appearance similarity score that exceeds a first determined threshold value, and said template matching score that is less than a second determined threshold value.

4. The video processing system according to claim 1, wherein said one or more circuits are further configured to determine a state transition of said at least one object from a first state of said at least one object in said previous image frame to a second state of said at least one object in said current image frame based on change in values of said template matching score and said appearance similarity score.

5. The video processing system according to claim 1, wherein said one or more circuits are further configured to compute said first feature of said at least one object in said current image frame based on said similarity score between said at least one feature of said at least one object in said current image frame and said at least one feature of said at least one object in said previous image frame, and a first parameter of said plurality of parameters.

6. The video processing system according to claim 1, wherein said one or more circuits are further configured to compute a second feature of said plurality of features of said at least one object in said current image frame based on said at least one feature of said at least one object in said current image frame, said at least one feature of said at least one object in said previous image frame, and a second parameter of said plurality of parameters.

7. The video processing system according to claim 1, wherein a first parameter of said plurality of parameters corresponds to a search area in said current image frame that is adjusted based on said determined current state of said at least one object in said current image frame.

8. The video processing system according to claim 1, wherein a second parameter of said plurality of parameters correspond to a learning rate that is adjusted based on said determined current state of said at least one object in said current image frame.

9. The video processing system according to claim 1, wherein said one or more circuits are further configured to determine said template matching score based on a constant factor.

10. The video processing system according to claim 1, wherein said one or more circuits are further configured to determine said appearance similarity score based on a set coefficient value.

11. The video processing system according to claim 1, wherein said one or more circuits are further configured to determine said current state as said normal state based on said appearance similarity score that exceeds a first determined threshold value, and said template matching score that exceeds a second determined threshold value.

12. The video processing system according to claim 1, wherein said one or more circuits are further configured to determine said current state as said first reacquisition state based on said appearance similarity score that exceeds a first determined threshold value, and said template matching score that exceeds a second determined threshold value.

13. The video processing system according to claim 1, wherein said one or more circuits are further configured to determine said current state as a second reacquisition state based on said appearance similarity score that is less than a first determined threshold value, and said template matching score that is less than a second determined threshold value.

14. A video processing method, comprising:
  capturing a sequence of image frames of video content, wherein said sequence of image frames comprises at least a previous image frame and a current image frame, wherein said current image frame and said previous image frame comprises at least one object, and wherein said at least one object is in motion;
  determining a template matching score based on a similarity score between at least one feature of said at least one object in said current image frame and at least one feature of said at least one object in said previous image frame;
  determining an appearance similarity score based on a difference between a first color distribution of said at least one object in said current image frame and a second color distribution of said at least one feature of said at least one object in said previous image frame;
  determining a current state of said at least one object in said current image frame based on said appearance similarity score and said template matching score, wherein said determined current state corresponds to one of a normal state, and occlusion state, a first reacquisition state, or a deformation state;
  adjusting a plurality of parameters based on said determined current state;
  computing a plurality of features of said at least one object in said current image frame based on said adjusted plurality of parameters; and
  tracking said at least one object in said current image frame based on a first feature of said computed plurality of features of said at least one object.

15. The video processing method according to claim 14, further comprising determining a state transition of said at least one object from a first state of said at least one object in said previous image frame to a second state of said at least one object in said current image frame based on change in values of said template matching score and said appearance similarity score.

16. The video processing method according to claim 14, further comprising computing said first feature of said at least one object in said current image frame based on said similarity score between said at least one feature of said at least one object in said current image frame, and said at least one feature of said at least one object in said previous image frame, and a first parameter of said plurality of second parameters.

17. The video processing method according to claim 14, further comprising computing a second feature of said at least one object in said current image frame based on said at least one feature of said at least one object in said current image frame, said at least one feature of said at least one object in said previous image frame, and a second parameter of said plurality of parameters.

18. The video processing method according to claim 14, wherein a first parameter of said plurality of parameters corresponds to a search area in said current image frame that is adjusted based on said determined current state of said at least one object in said current image frame.

19. The video processing method according to claim 14, wherein a second parameter of said plurality of parameters correspond to a learning rate that is adjusted based on said determined current state of said at least one object in said current image frame.

20. The video processing method according to claim 14, wherein said determination of said template matching score is further based a determined constant factor.

21. The video processing method according to claim 14, wherein said determination of said appearance similarity score is further based on a determined coefficient value.

* * * * *